United States Patent [19]

Ward

[11] 3,818,283

[45] June 18, 1974

[54] CROSSBAR SWITCH MODULE CABINET INSTALLATION

[76] Inventor: Lloyd G. Ward, 3142 Lariat Dr., Garland, Tex. 75042

[22] Filed: July 17, 1973

[21] Appl. No.: 379,933

[52] U.S. Cl. ..... 317/122, 174/DIG. 9, 317/101 CB, 179/98

[51] Int. Cl. .......................... H02b 1/04, H02b 1/20

[58] Field of Search .......: 317/99, 101 CB, 112, 120, 317/101 DH, 122; 179/98, 99; 174/DIG. 9, 69

[56] References Cited

UNITED STATES PATENTS

| | | | |
|---|---|---|---|
| 3,448,346 | 6/1969 | Webb | 317/122 |
| 3,657,608 | 4/1972 | Leone | 317/101 CB |
| 3,755,716 | 8/1973 | Yoshii | 317/122 |

*Primary Examiner*—Robert K. Schaefer
*Assistant Examiner*—Gerald P. Tolin
*Attorney, Agent, or Firm*—Warren H. Kintzinger

[57] ABSTRACT

A crossbar switch module box installation with a plurality of the module boxes mounted by slides in a cabinet for slide out access to crossbar switches during installation, test and maintainance. Module boxes are mounted in back to back relation to be slid in and out from the front and back of the electronic switch control cabinet and for maximum packaging density. Plug in connector equipped pendant cables are so installed as to facilitate the maximum packaging density slide in and out module box installation with the pendant cables looped up and over from their plug-in connectors with adequate slack to accomodate the sliding in and out of respective module boxes. The cables extend to and are looped through a cable clamp that tightly clamp holds the cables from a module box in place with a desired cable non-flexing bend to extend upward in the cabinet to electronic equipment thereinabove.

18 Claims, 4 Drawing Figures

CROSSBAR SWITCH MODULE CABINET INSTALLATION

Figures 1, 3, 4:
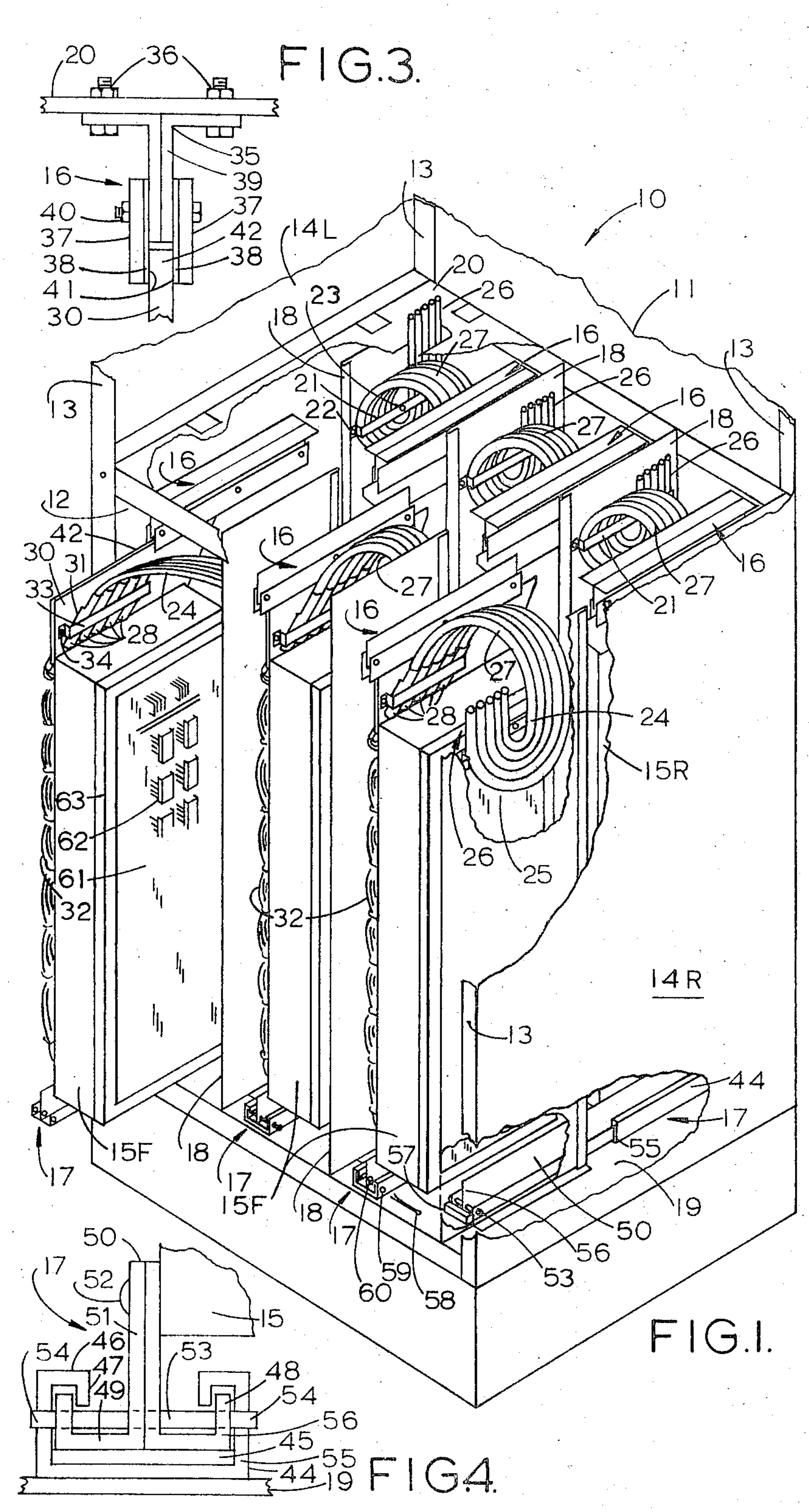

This invention relates in general to telephone switching systems, and in particular, to a crossbar switch module box installation with a plurality of module boxes slide mounted and connected by pendant cables and other switching control cabinet electronics for maximum packaging density.

Many telephone line switching control centers include involved open rack equipment mounting and wired structures occupying considerable space and as such not esthetically suited for placement in multi-use rooms such as conventional offices. Further, maintainance with such systems can be a real problem many times requiring more than one service man cooperatively working to properly repair and maintain the switching station system. Obviously, such complexity and onerous service requirements must be lessened and/or overcome in providing an acceptable private telephone switching control exchange system designed to satisfy the requirements of all business and industry applications where key telephones are practical. It is importnat that space requirements be minimized for such private automatic branch exchange useage and that the system be expandable by increments from a minimum center switching capability to a maximum by addition of modular sections as required. Even further, it is important to optimize transmission characteristics and also to take advantage of the speed and reliability inherently attainable through use of solid state circuitry.

It is, therefore, a principal object of this invention to provide a private key telephone exchange switching center attractively enclosed with modular crossbar units for maximum equipment density in a system using hard contact switching techniques via crossbar contacts and minature telephone relays combined with solid state control.

Another object is to optimize transmission characteristics while taking advantage of the speed and reliability attained with solid state circuitry.

A further object is to provide improved test and maintainance with modular crossbar units slidably mounted for easy access, removal and/or replacement.

Another object with such key telephone exchange units is to provide a cable to crossbar module interconnect system with plug-in connectors facilitating slide-in slide-out positioning for maintainance and testing.

Features of this invention useful in accomplishing the above objects include, in a crossbar switch module cabinet installation as part of a private key telephone cabinet packaged exchange switching center, a plurality of crossbar switch module boxes mounted by cabinet slides for slide-in slide-out access to the crossbar switches during installation, test and maintainance. Further, crossbar module boxes are mounted in back-to-back relation to be slid in and out from the front and back of the electronic switch control cabinet when front and rear cabinet panels are removed and for maximum packaging density. Plug-in connector equipped pendant cables facilitate the maximum packaging density installation arrangement with the pendant cables looped up and over from their respective plug-in connections to module boxes and cable slack accommodating sliding in and out of the respective module boxes. A clamp support for each module box family of cables clamps the cables with a fixed minimum radius between the slack lengths thereof and the upward extension therefrom to connection with electronic equipment within the cabinet thereinabove.

A specific embodiment representing what is presently regarded as the best mode of carrying out the invention is illustrated in the accompanying drawings.

Figure 2:
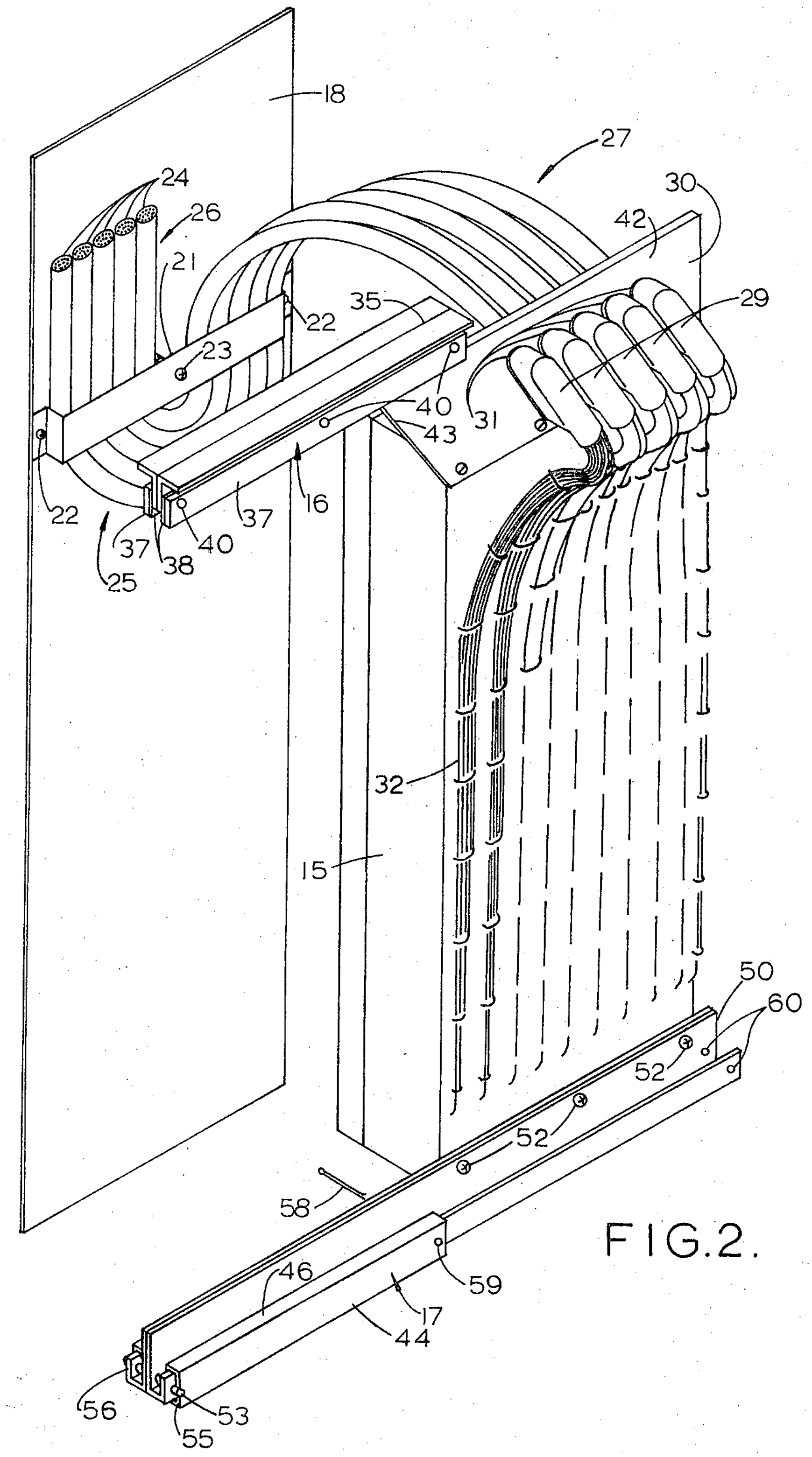

In the drawings:

FIG. 1 represents a broken away perspective view of a private automatic branch telephone exchange cabinet with the upper portion removed showing a multiple crossbar module installation in the cabinet base;

FIG. 2, an enlarged perspective view of a single crossbar switch module showing cabinet slide mounting detail therefor and with the module in the slid out state;

FIG. 3, an end view of crossbar module mounting upper slide detail; and

FIG. 4, an end view of crossbar module mounting lower slide detail.

Referring to the drawings:

The private automatic branch telephone exchange cabinet 10 of FIG. 1 is shown with the upper portion of the cabinet and other sections thereof removed including a front panel (not shown), while a rear panel 11 is still in place, to show crossbar module box installation bay 12. The front and rear panels 11 that are duplicates of each other are mounted by conventional means (detail not shown) and extend transversely to cover flanges 13 of left and right sides 14L and 14R of the cabinet 10. When the front or rear panel 11 is removed any of the front crossbar module boxes 15F, with the front panel 11F off, or of the rear crossbar module boxes 15R, with the rear panel 11R off, may be slid out and back in. This is with the upper mounting slide guide assembly 16 and with the crossbar module lower mounting slide guide assembly 17 mounting of each crossbar module box 15 facilitating such movement.

The crossbar module box installation bay 12 is divided into individual crossbar module receiving sections for both front and back module boxes 15 by vertically extended divider panels 18 fastened to bay bottom plate 19 and at the top to bay top framing 20. Referring also to FIG. 2 divider panels 18 also mount cable clamps 21 that are fastened thereto by two end bolts or screws 22 and a longer center bolt or screw 23 to tightly clamp a crossbar module set of five cables 24 in place against the respective divider panel with a minimum radius (particularly of the innermost cable 24) non-flexing fixed loop turn 25. This loop turn 25 is between the upward extended portion 26 of the cables 24 extending to cabinet 10 housed electronic equipment thereinabove (not shown) and an upwardly arched slack section 27 of cables 24. The arched slack section 27 of cables 24 as pendant cables terminate in a downward angled set of five male connectors 28 plugged into mating engagement with five female connectors 29 fixed in place on the back side of connector mount plate 30 with a portion of each female connector 29 projecting through slanted openings 31 in connector mount plate 30. The female connectors 29 are permanently mounted in place and permanently wired into back wiring 32 of the respective crossbar module box 15. The five male connectors 28 may be disconnected from their respective mating female connectors 29, however, bracket 33 spanning all five male connectors 28 and fastened in place on connector mount plate 30 by screws 34 insures that the male connectors 28 remain in mating engagement with their female connectors 29 unless it is intended that they be disconnected. This first requires that bracket 33 be dismounted from an assembly that insures connector engagement throughout the entire range of crossbar module box in and out sliding movement.

Referring also to FIG. 3 each crossbar module upper mounting slide guide assembly 16 includes a T shaped bracket unit 35 mounted in place on top framing 20 by bolt assemblies 36. Each upper slide guide assembly 16 also includes opposite side metal bands 37 each with a plastic strip 38 (nylon in this instance) at the inner side, all assembled to the stem 39 of the T bracket unit 35 by bolt assemblies 40. The inner surfaces 41 of the nylon strips 38 form a smooth sliding fit retaining guide for the upper edge 42 of the connector mount plate 30 of the respective crossbar module box 15. Each connector mount plate 30 at the inner end thereof has a slanted end 43 to present greater length at the top and still have a portion within the guide between nylon strips 38 with that particular module box 15 slid to its outermost stop position.

Referring in addition to FIG. 4 each crossbar lower mounting slide guide assembly 17 includes a U shaped guide track 44, fixed to the bay bottom plate 19 by bonding or screws (detail not shown), with the track holding a sheet of Teflon 45 therewithin on the inside base of the U shape (in end view) of track 44. The U shape of guide track 44 includes turned over inwardly extended upper ends 46 having inner downward extended flange extensions 47 that guide restrain upturned edges 48 of the cross 49 of inverted T shaped guide strip 50. The shank 51 of T shaped guide strip 50 is mounted to respective module boxes by screw fasteners 52. The cross of T shaped guide strip 50 slidingly rides on a bed of Teflon in sliding over the Teflon sheet 45. Teflon is used here since the weight of a crossbar module box must be supported thereby while nylon may be used with upper mounting slide guide assemblies 16 with the lighter duty requirements imposed thereon and a resulting material cost savings. The innermost end of each inverted T shaped guide strip 50 is equipped with a stop pin 53 horizontally transversely extended therethrough. End projections 54 of stop pin 53 come into stopping engagement with the inner end 55 of the mating U shaped guide track 44 to stop the crossbar module box 15 in its outermost position with the slanted end portion of upper edge 42 of the connector mount plate 30 of that module box 15 still retained within the guide between nylon strips 38 at the top. Please note that module boxes 15 slide into the innermost positions with inner ends 56 of T guide strips 50 in abutting stop engagement with stop blocks 57 mounted on bay bottom plate 19 (mounting means not shown). In this state the inverted T shaped guide strips 50 extend well into the base area of the immediately adjacent front and rear end to end related module box closely adjacent the bottom of a divider panel 18 and just above bay bottom plate 19 with these alternating in their back to back reversed relation and in accord with the design symmetry thereof. Reference to the lower fore corner of the cabinet 10 through the broken away portion of cabinet wall 14R and broken away portion of divider panel 19 should help in visualizing the slid in relation of lower mounting slide guide assemblies 17. With crossbar module boxes 15 slid into their innermost positions cotter keys 18 may be inserted through openings 59 in U shaped guide tracks 44 and through openings 60 in the shanks of inverted T shaped guide strips 50 to fix stabilize the inserted position of the module boxes 15 within bay 12 of the cabinet 10 through extended periods of normal automatic branch telephone exchange useage. The crossbar module boxes 15 are provided with a transparent cover panel 61 through which internal electronics 62 may be viewed with a transparent cover panel 61 held in place on each box 15 by snap on rectangular molding frames 63 (refer to the partially pulled out box 15F in FIG. 1).

Whereas this invention is herein illustrated and described with respect to a specific embodiment hereof, it should be realized that various changes may be made without departing from essential contributions to the art made by the teachings hereof.

I claim:

1. An electronic equipment module cabinet installation, including: electronic equipment module mounting means permitting inward and outward movement of an electronic equipment module; a family of electric wire cables connected to said electronic equipment module; said family of cables at their connection points to said module being in longitudinal alignment in the direction of module permitted inward and outward movement; a panel mounted in said cabinet; clamp support means mounted on said panel clamping said family of electric wire cables on said panel in a fixed cable radius turn relation with the cables in substantially planar side by side relation through the cable lengths in the fixed cable radius turn and under the clamp support means against said panel in a plane substantially parallel to the direction of said module permitted inward and outward movement; and with slack lengths of said cables in said family of electric wire cables running from the connection points of said cables to said module to said clamp support means.

2. The electronic equipment module cabinet installation of claim 1, wherein the connection points of said family of cables are through two elongate mating connector elements for each cable with a first connector element mounted to a connector mount plate at the top of said electronic equipment module; a second connector element connected to an end of a cable of said family of cables; and with a plurality of said first elongate connector elements mounted in aligned slanted parallel relation and the slant being from the bottom of each first connector element back to the top in the direction of said module permitted inward movement.

3. The electronic equipment module cabinet installation of claim 2, wherein said electronic equipment module mounting means permitting inward and outward movement of an electronic equipment module includes, cabinet mounted module mounting slide guide means; longitudinally slideable element means in said guide means; inner module position stop means mounted in said cabinet engaged as a stop by an element of said slideable element means; and outer module position stop means mounted in said cabinet engaged as a stop by an element of said slideable element means.

4. The electronic equipment module cabinet installation of claim 3, wherein said slack lengths of said family of cables are so matched in length and of sufficient lengths to permit the full range of module slid-in slid-out movement with the cable connector elements remaining connected and the cables retaining an aligned side by side relation.

5. The electronic equipment module cabinet installation of claim 4, wherein a plurality of said second connector elements are connected individually to cable ends with each cable initially extending from its connection with its individual second connector element upward and back, as a pendant cable, in initially where the cable departs from its said second connector element substantially the same slant established by the slant of said first connector elements when said second connector elements are plugged in mating engagement with said first connector elements.

6. The electronic equipment module cabinet installation of claim 5, wherein said connector mount plate is a vertically and longitudinally extended planar plate mounted on said electronic equipment module generally parallel to the direction of said module permitted inward and outward movement.

7. The electronic equipment module cabinet installation of claim 6, wherein said cables of said family of cables in addition to initially extending upward and back also extend away from said connector mount plate in a loop to clamped contact with said panel beneath said clamp support means; and with said panel transversely displaced from said connector mount plate.

8. The electronic equipment module cabinet installation of claim 7, wherein said first and second connector elements are mating elongate multiple pin and multiple socket connectors; and bracket means spanning the plurality of said second connector elements in connector mating retaining contact for a cable family when the bracket is mounted in place on said connector mount plate.

9. The electronic equipment module cabinet installation of claim 7, wherein the cables of said family of cables enters the clamped state behind said clamp support means from the slack lengths thereof to extend through said fixed cable radius turn to emerge in upwardly extended side by side cable continuation of said cable family to distributed connection with cabinet contained electronic equipment at various locations displaced therefrom.

10. The electronic equipment module cabinet installation of claim 6, wherein said cabinet mounted module slide guide means includes a lower combination module mount and slide guide assembly with a U shaped channel member mounted in fixed position in said cabinet below said module when the module is in the slid in state; an elongated inverted T shaped member longer than said U shaped channel member with the shank of the T fastened to the bottom portion of said module and the cross of the inverted T shaped member fitted into and guided in relative longitudinal sliding movement by said U shaped channel member; and a sheet of dry lubricant material extended substantially the length of and in the base of said U shaped member providing a slidable supporting base for the cross of said T shaped member.

11. The electronic equipment module cabinet installation of claim 10, wherein said cabinet mounted module mounting slide guide means also includes an upper mounting slide guide assembly with spaced apart parallel longitudinally extended slide guide members mounted in fixed position in said cabinet above said module when the module is in the slid in state; said spaced apart parallel longitudinally extended slide guide members being lined with sheets of dry lubricant material extended substantially the longitudinal length of said spaced apart parallel slide guide members; and a module member upper edge slidingly received between said spaced apart parallel slide guide members for longitudinally guided sliding movement therein.

12. The electronic equipment module cabinet installation of claim 11, wherein said module member upper edge is the upper edge of said connector mount plate; and with said connector mount plate having a slanted inner end to present greater length at the top and still have a portion between the upper mounted slide guide spaced apart parallel slide guide members.

13. The electronic equipment module cabinet installation of claim 12, wherein said outer module position stop means includes, a stop pin mounted and carried by the inner end portion of said inverted T shaped member; and the inner end of said U shaped channel member in alignment with end portions of said stop pin being the stop therefor when said module is slid to its outermost stop position.

14. The electronic equipment module cabinet installation of claim 13, wherein said inner module position stop means is provided by a stop member mounted in said cabinet to be engaged by the inner end of said inverted T shaped member as it and the module are slid into the innermost module stop position.

15. The electronic equipment module cabinet installation of claim 14, wherein a plurality of said electronic equipment modules are mounted in closely spaced high equipment density relation within a cabinet bay.

16. The electronic equipment module cabinet installation of claim 15, wherein a plurality of said electronic equipment modules are mounted in closely spaced side by side relation.

17. The electronic equipment module cabinet installation of claim 16, wherein said cabinet bay has front and rear openings with removable front and rear cover panels; there are two back to back rows of closely spaced side by side electronic equipment modules with one row of modules slidable out to the front and with the other row of modules slidable out to the rear.

18. The electronic equipment module cabinet installation of claim 17, wherein there is a family of cables for each module; a plurality of panels mounting said clamp support means one for each of said modules; and with the inverted T shaped members of said lower combination module mount and slide guide assembly of each module projecting from the rear of the module far into the cabinet bay area of the row of modules to the rear of the respective modules when the respective modules are in the slid in limit position.

* * * * *